United States Patent
Taniguchi

(10) Patent No.: US 6,400,694 B1
(45) Date of Patent: *Jun. 4, 2002

(54) DUPLEX COMMUNICATION PATH SWITCHING SYSTEM

(75) Inventor: Takayuki Taniguchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/655,316

(22) Filed: May 24, 1996

(30) Foreign Application Priority Data

Jun. 20, 1995 (JP) .............................. 7-153200

(51) Int. Cl.$^7$ .................................................. H04J 1/16
(52) U.S. Cl. ........................ 370/276; 370/241; 714/717
(58) Field of Search ................................ 370/276, 294, 370/452, 245, 522, 445, 224, 223, 405, 437, 424, 460, 249, 410, 403, 404, 228, 241; 340/825.05; 395/200.81; 364/229.3; 714/717; 359/161

(56) References Cited

U.S. PATENT DOCUMENTS

| | | | | | |
|---|---|---|---|---|---|
| 4,926,418 A | * | 5/1990 | Cidon et al. | ......... | 340/825.05 X |
| 5,003,531 A | * | 3/1991 | Farinholt et al. | ... | 340/825.05 X |
| 5,053,946 A | * | 10/1991 | Jain | ....................... | 395/200.81 |
| 5,155,726 A | * | 10/1992 | Spinney et al. | ..... | 340/825.05 X |
| 5,191,579 A | * | 3/1993 | Matsushita et al. | ......... | 370/224 |
| 5,199,025 A | * | 3/1993 | Miwa | ......................... | 370/224 |
| 5,282,200 A | * | 1/1994 | Dempsey et al. | ... | 340/825.05 X |
| 5,309,435 A | * | 5/1994 | Hirome | ............ | 340/825.05 X |
| 5,313,456 A | * | 5/1994 | Sugawara | .................... | 370/228 |
| 5,440,540 A | * | 8/1995 | Kremer | ...................... | 370/223 |
| 5,442,629 A | * | 8/1995 | Geyer et al. | ............ | 370/452 X |
| 5,532,862 A | * | 7/1996 | Tada et al. | ................... | 359/161 |
| 5,581,710 A | * | 12/1996 | Noel, Jr. et al. | ........ | 340/825.05 |
| 5,631,896 A | * | 5/1997 | Kawase et al. | .............. | 370/228 |

FOREIGN PATENT DOCUMENTS

EP 696 111 A2 * 2/1996

* cited by examiner

Primary Examiner—Brian Zimmerman
(74) Attorney, Agent, or Firm—Katten Muchin Zavis Rosenman

(57) ABSTRACT

A duplex communication path switching system provided at each of nodes connected by a communication path which is formed of clockwise and counterclockwise transmission lines in a ring network. The duplex communication path switching system includes a checking circuit for checking whether or not each of a plurality of units of the signal received from each of the clockwise transmission line and the counterclockwise transmission line is normal, and a switching circuit for switching the communication path between the clockwise transmission line and the counterclockwise transmission line based on checking results obtained by the checking circuit so that units which are normal are selected from the signals. Each of the plurality of units of the signal has a constant speed and is provided with frame information defined for the signal transmitted through the communication path, the frame information being used to divide the signal into the plurality of units.

6 Claims, 13 Drawing Sheets

FIG. 10

| GATE \ CONT | 1-2 | 1-3 | 1-4 | 1-5 | 2-1 | 2-3 | 2-4 | 2-5 | 3-1 | 3-2 | 3-4 | 3-5 | 4-1 | 4-2 | 4-3 | 4-5 | 5-1 | 5-2 | 5-3 | 5-4 |
|---|---|---|---|---|---|---|---|---|---|---|---|---|---|---|---|---|---|---|---|---|
| 1 |  |  |  |  |  |  |  |  |  |  |  |  |  |  |  |  |  |  |  |  |
| 2 |  |  |  |  |  |  |  |  |  |  |  |  |  |  |  |  |  |  |  |  |
| 3 |  |  |  |  |  |  |  |  |  |  | O |  |  |  |  |  |  |  |  |  |
| 4 |  |  |  |  |  |  |  |  |  |  |  |  |  |  | O |  |  |  |  |  |
| 5 |  |  |  |  |  |  |  |  |  |  |  |  |  |  |  |  |  |  |  |  |

DUPLEX COMMUNICATION PATH SWITCHING SYSTEM

BACKGROUND OF THE INVENTION (1) Field of the Invention

The present invention generally relates to a duplex communication path switching system, and more particularly to a duplex communication path switching system applicable to a ring network which can effectively switch a duplex communication path for data transmitted at any speed.

(2) Description of the Related Art

In a ring network, a communication path is duplicated in order to improve reliability of communication. That is, a clockwise transmission line and a counterclockwise transmission line link respective nodes together, at which nodes terminals are accommodated. A direction in which data is transmitted through the clockwise transmission line is opposite to a direction in which data is transmitted through the counterclockwise transmission line. At each node, signals from terminals are supplied to both the clockwise transmission line and the counterclockwise transmission line so as to be transmitted through both the transmission lines in opposite directions. At a node accommodating destination terminals, normal signals are selected from among signals received from the clockwise transmission line and the counterclockwise transmission line. The above communication system is referred to as a transmission-hybrid/receive-selecting system. At a receiver-side node, to select the normal signals, the communication path is switched from the clockwise transmission line to the counterclockwise transmission line or from the counterclockwise transmission line to the clockwise transmission line. A system for switching the communication path between the clockwise transmission line and the counterclockwise transmission line is referred to as a duplex communication path switching system.

FIG. 1 shows an example of the ring network. Referring to FIG. 1, the ring network has a clockwise transmission line $L_R$ and a counterclockwise transmission line $L_L$ which link nodes A, B, C and D. For example, at the node A, a signal received from a terminal 100 is supplied to both the clockwise transmission line $L_R$ and the counterclockwise transmission line $L_L$ via a hybrid connector 101. The communication path is switched by use of a selective connector 102 between the clockwise transmission line and the counterclockwise transmission line so that a normal signal is selected, as a signal to be received by the terminal 100, from among signals transmitted through the transmission lines $L_L$ and $L_R$. At the node B, in the same manner as at the node A, a signal received from a terminal 200 is supplied to the clockwise transmission line $L_R$ and the counterclockwise transmission line $L_L$ via a hybrid connector 201, and the switching operation between the clockwise transmission line $L_R$ and the counterclockwise transmission line $L_L$ is performed by use of a selective connector 202 so that a normal signal is selected as a signal to be received by the terminal 200 from among signals transmitted through both the transmission lines $L_R$ and $L_L$. The other nodes C and D have the same structure as the nodes A and B described above.

In order to determine which received signal is to be selected as the normal signal from the clockwise transmission line or from the counterclockwise transmission line, a frame signal added to the received signal or error checking information is checked. This checking operation is performed for every unit of transmission signal (this unit is referred to as a switched-signal unit).

In a case of the conventional PDH (Presynchronous Digital Hierarchy), a Handling Group (HG) of 64 kbps×6, a unit of 1.5 Mbps or a unit of 6.3 Mbps is used as the switched-signal unit. In a case of the SDH (Synchronous Digital Hierarchy), a unit of multiplexed signals, such as VC1 or VC22, is used as the switched-signal unit.

At each node, signals from a plurality of terminals are multiplexed. To multiplex the signals, circuits (e.g., multiplexers) for multiplexing the signals are hierarchically coupled to each other. Circuits in the lowest hierarchy are coupled to the respective terminals and output signals each corresponding to the switched-signal unit. A circuit in the highest hierarchy is coupled to the communication path (both the clockwise transmission line and the counterclockwise transmission line). Each of the circuits is duplicated to improve the reliability. If an error is detected in a multiplex signal in a circuit, an alert signal is supplied to circuits in lower side hierarchies so that the circuits in the lower side hierarchies are respectively switched to other circuits. If an error is detected in a signal in a circuit in the lowest hierarchy, only the circuit in which the error has occurred is switched to another circuit.

Meanwhile, when the communication path is switched between the clockwise transmission line and the counterclockwise transmission line in a receiving-side node, an accurate communication signal must be obtained in the receiving-side node. Thus, in the conventional duplex communication path switching system, a transmission speed in the communication path between nodes is limited to the speed (bps:bits per second) of the switched-signal unit of the signal.

There are two kinds of switching logic, 0/1-system switching logic and N(normal)/E(emergency)-system switching logic.

In the 0/1-system switching logic, one of a 0-system and a 1-system is selected as a normal system. For example, the 0-system is selected as the normal system. When the 0-system malfunctions, the 0-system is switched to the 1-system. After this, the 1-system is continuously selected as the normal system although the 0-system is recovered. In the N/E-switching logic, an N-system is usually selected as the normal system. When the N-system malfunctions, the N-system is switched to the E-system. After this, if the N-system is recovered, the E-system is switched back to the N-system.

The communication path may be switched between the clockwise transmission line and the counterclockwise transmission line in accordance with the 0/1-system switching logic. In this case, the clockwise transmission line and the counterclockwise transmission line are used as the 0-system and the 1-system flexibly. As a result, if a signal in a line with a transmission speed corresponding to a plurality of switched-signal units is transmitted through the communication path, switched-signal units from the 0-system and the 1-system may be arranged at random in a received signal.

The communication path may be switched between the clockwise transmission line and the counterclockwise transmission line in accordance with the N/E-system switching logic. In this case, the clockwise transmission line and the counterclockwise transmission line are used as the N-system and the E-system fixedly. As a result, when the N-system malfunctions and is then recovered, switched-signal units from the N-system and the E-system are mixed in a received signal.

A delay time in the clockwise transmission line between nodes differs from a delay time in the counterclockwise transmission line between the nodes. Therefore, a received signal in which switched-signal units from the clockwise transmission line and the counterclockwise transmission line are mixed may be incorrect. That is, communication between terminals accommodated at different nodes coupled to the clockwise transmission line and the counterclockwise transmission line may be not accurately performed.

For example, in a case where the HG (the Handling Group in the PDH) is used as the switched-signal unit, a communication path having a speed greater than 384 (64×6) Kbps corresponding to the HG cannot be formed in the ring network. However, in recent years, a data communication speed is improved, and it is desired that a communication path in which switched-signal units corresponding to various speeds (from a low speed to a high speed) are formed.

SUMMARY OF THE INVENTION

Accordingly, a general object of the present invention is to provide a novel and useful duplex communication path switching system in which the disadvantages of the aforementioned prior art are eliminated.

A specific object of the present invention is to provide a duplex communication path switching system capable of switching a duplex communication path between a clockwise transmission direction and a counterclockwise direction so that units are accurately selected from the clockwise transmission line and a counterclockwise transmission line The above objects of the present invention are achieved by a duplex communication path switching system provided at each of nodes connected by a communication path in a ring network, the communication path having a first transmission line through which a signal is transmitted in a first direction and a second transmission line through which a signal is transmitted in a second direction opposite to the first direction, a signal formed of a plurality of units being supplied to the first transmission line and the second transmission line in parallel to transmit the signal from one node to another through the communication path, the duplex communication path switching system comprising: checking means for checking whether or not each of the plurality of units of the signal received from each of the first and second transmission lines is normal; and switching means for switching the communication path between the first transmission line and the second transmission line based on checking results obtained by the checking means so that units which are normal are selected from the signal, wherein each of the plurality of units of the signal has a constant speed and is provided with frame information defined for the signal transmitted through the communication path, the frame information being used to divide the signal into the plurality of units.

According to the present invention, the communication path is switched using the frame information provided in each of the units of the signal. Thus, the communication path can be switched between the first and second transmission lines so that units are accurately selected from the first and second transmission lines.

Another object of the present invention is to provide a duplex communication path switching system capable of switching the duplex communication path under a condition in which a transmission speed of the duplex communication path between nodes in a ring network is not limited to a transmission speed of each switched-signal unit which is a signal unit checked as to whether the duplex communication path is to be switched.

The above objects of the present invention are also achieved by a duplex communication path switching system in which each of a plurality of units of the signal is provided with specific frame information which is specific to the each of the plurality of units, and the specific frame information is used to divide the signal into the plurality of units instead of the above frame information.

According to the present invention, the communication path is switched using the specific frame information provided in each of the units of the signal. Thus, even if the units of the signal have various speeds, the duplex communication path can be switched so that the units are accurately selected from the first and second transmission lines. That is, the communication path can be switched under a condition in which a transmission speed of the duplex communication path between nodes in a ring network is not limited to a transmission speed of each unit which is checked whether the duplex communication path is to be switched.

BRIEF DESCRIPTION OF THE DRAWINGS

Other objects, features and advantages of the present invention will be apparent from the following accompanying drawings, in which:

FIG. 10 is a diagram illustrating an example of the connection information;

DETAILED DESCRIPTION OF THE PREFERRED EMBODIMENTS

A description will be given, with reference to FIG. 2, of a first embodiment of the duplex communication path switching system.

Figure 1:
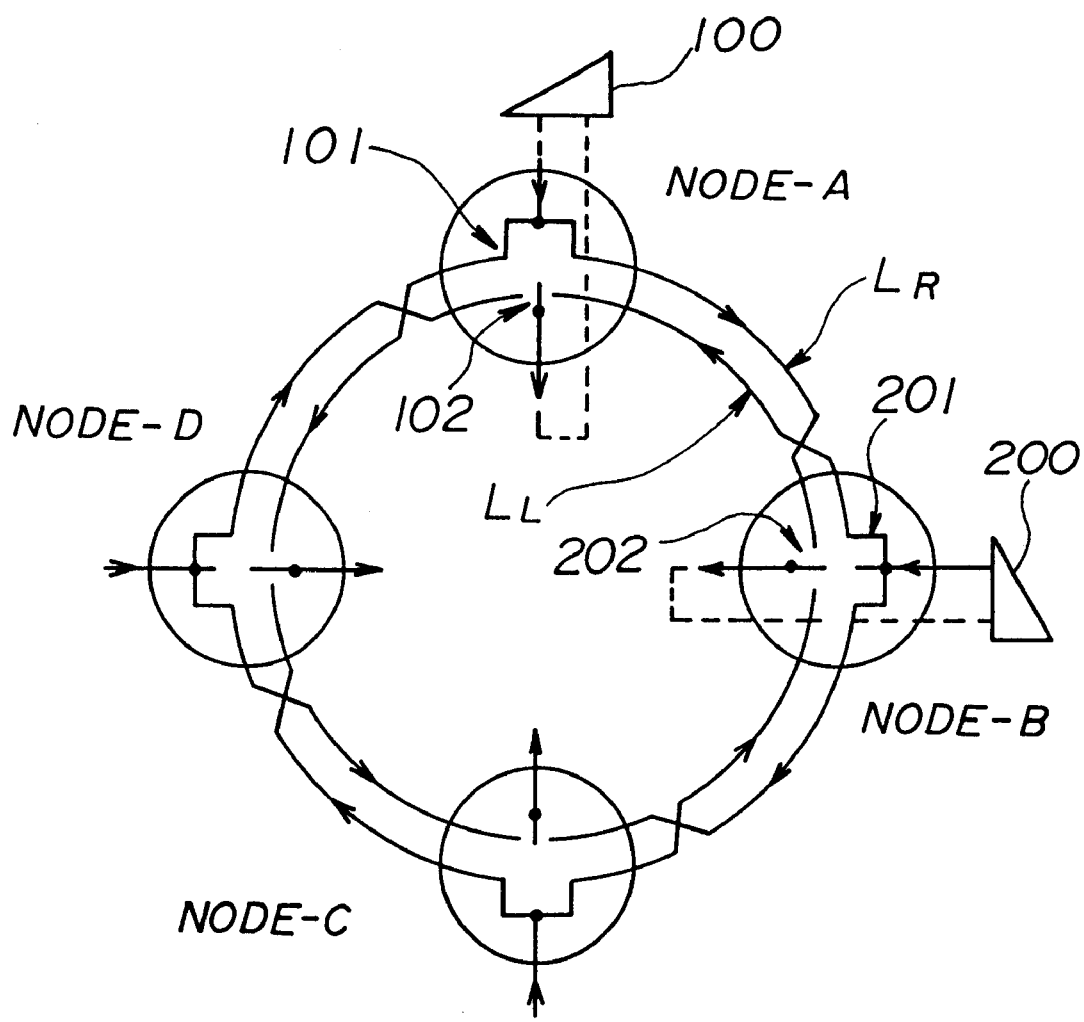
FIG. 1 is a diagram illustrating an example of a structure of a ring network.
Figure 2:
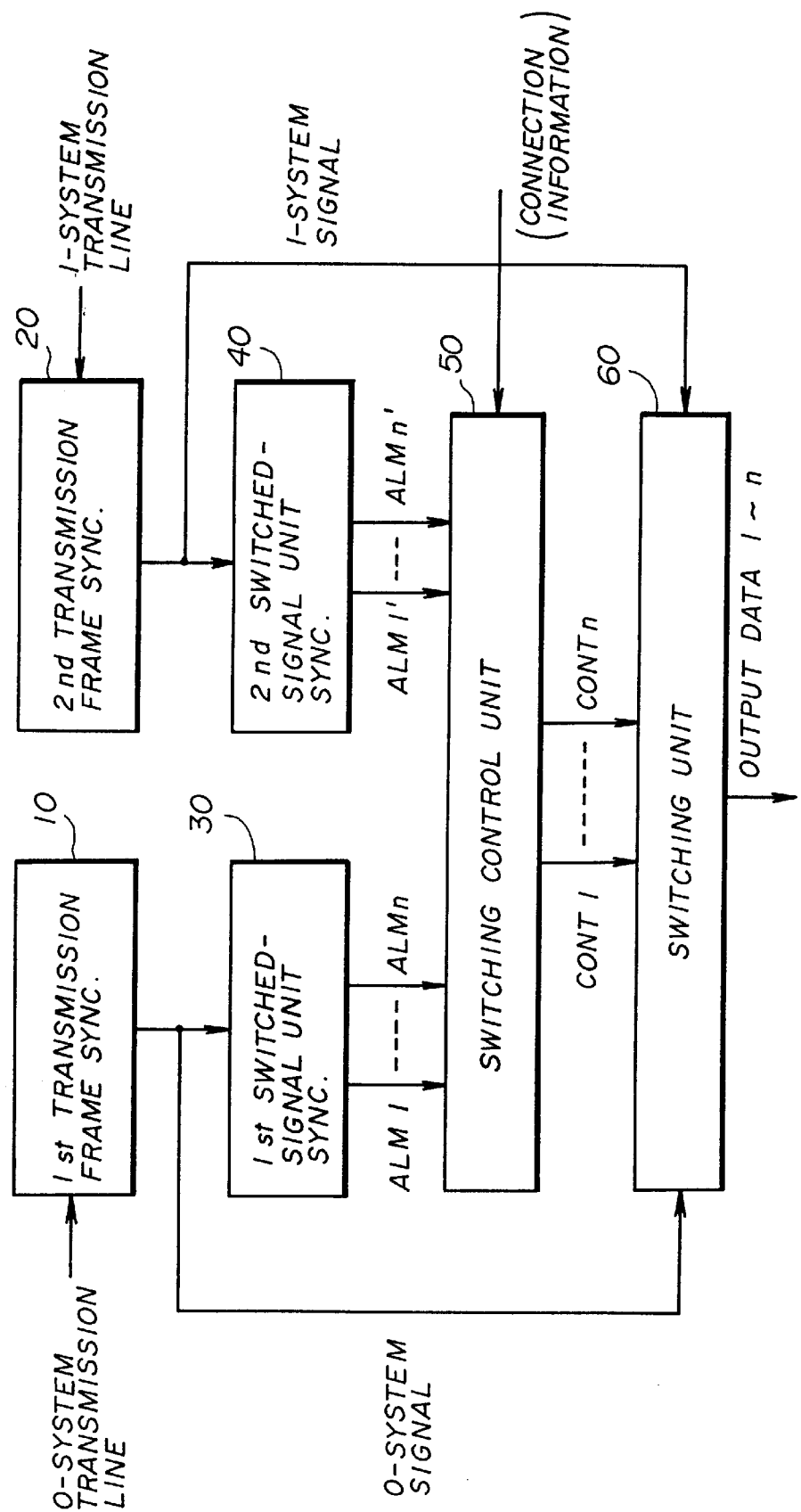
FIG. 2 is a block diagram illustrating a first embodiment of the duplex communication path switching system applied to a node in the ring network.

The duplex communication path switching system shown in FIG. 2 is applied to a node of the ring network as shown in FIG. 1. In this embodiment, a signal in which frame information is defined for every signal unit is transmitted through the duplex communication path of the ring network. The signal unit is used as the switched-signal unit which is checked whether the duplex communication path is to be switched. The frame information is defined, for example, by the standard of ITU-T (International Telecommunication Union) G.703.

Referring to FIG. 2, the duplex communication switching system has a first transmission frame synchronous unit 10, a second transmission frame synchronous unit 20, a first switched-signal unit synchronous unit 30, a second switched-signal unit synchronous unit 40, a switching control unit 50 and a switching unit 60. The first transmission frame synchronous unit 10 synchronizes transmission frames received from a 0-system transmission line (e.g., the clockwise transmission line). Each of the transmission frames is formed of n switched-signal units (1–n). Each of the transmission frames synchronized by the first transmission frame synchronous unit 10 is referred as a 0-system signal. The second transmission frame synchronous unit 20 synchronizes transmission frames received from a 1-system transmission line (e.g., the counterclockwise transmission line). Each of the transmission frames is formed of n switched-signal units (1'–n'). Each of the transmission frames synchronized by the second transmission frame synchronous unit 20 is referred to as a 1-system signal.

The first switched-signal unit synchronous unit 30 synchronizes the switched-signal units of each of the 0-system signals synchronized by the first transmission frame synchronous unit 10. The first switched-signal unit synchronous unit 30 further checks whether or not each of the switched-signal units (1–n) is normal, and outputs alarm signals (ALM1–ALMn) each of which indicates whether a corresponding one of the switched-signal units (1–n) is normal or abnormal. The second switched-signal unit synchronous unit 40 synchronizes the switched-signal units of each of the 1-system signals synchronized by the second transmission frame synchronous unit 20. The second switched-signal unit synchronous unit 40 further checks whether or not each of the switched-signal units (1'–n') is normal, and outputs alarm signals (ALM1'–ALMn') each of which indicates whether a corresponding one of the switched-signal units (1'–n') is normal or abnormal.

The above check of each of the switched-signal units in the first and second switched-signal unit synchronous units 30 and 40 may be performed in accordance with a frame synchronous checking method using the frame information added to the signal. The check of each of the switched-signal units may be also performed using error checking information added to the signal. For example, a parity check using parity bits added to the signal, or a CRC check using CRC (Cyclic Redundancy Check) bits may be performed to check whether or not each of the switched-signal units is normal.

The switching control unit 50 determines, based on states of the alarm signals (ALM1–ALMn) in the 0-system and the alarm signals (ALM1'–ALMn') in the 1-system, which switched-signal unit should be selected from the 0-system signal or the 1-system signal. Based on the determination result, the switching control unit 50 outputs selecting signals (CONT1–CONTn) each of which indicates the 0-system signal or the 1-system signal from which the switched-signal unit is selected. The switching unit 60 performs a switching operation based on the selecting signals (CONT1–CONTn) so that the switched-signal unit is selected from the 0-system signal or the 1-system signal. Output data formed of the switched-signal units (1–n) selected by the switching unit 60 is supplied from the switching unit 60 to a terminal at the receiving side.

One of the HG (Handling Group), a unit of 1.5 Mbps and a unit of 6.3 Mbps in the PDH and the VC1 and the VC22 in the SDH may be used as the switched-signal unit.

Figure 3:
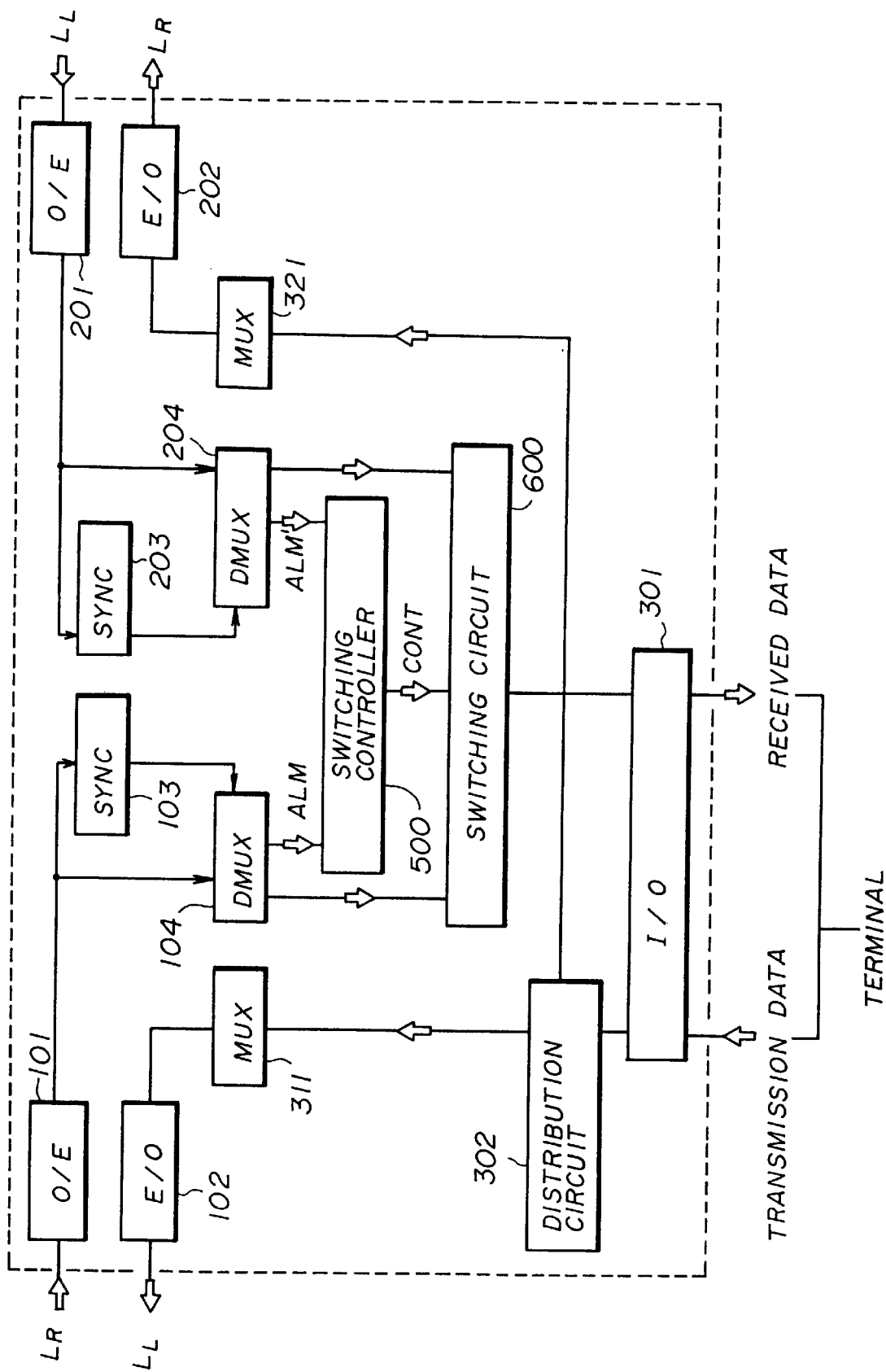
FIG. 3 is a block diagram illustrating an example of a detailed structure of the duplex communication path switching system according to the first embodiment of the present invention.

A detailed structure of a node in the ring network to which the duplex communication path switching system as shown in FIG. 2 is applied is shown in FIG. 3.

Referring to FIG. 3, the node is provided with a terminal interface circuit 301, a distribution circuit 302, multiplexer units 311 and 321 and E/O converters 102 and 202. Transmission data from terminals are supplied to the distribution circuit 302 through the terminal interface circuit 301. The distribution circuit 302 distributes the transmission signal to the multiplexer units 311 and 321. Each of the multiplexer units 311 and 321 multiplexes a plurality of transmission data items in accordance with a predetermined multiplexing scheme and outputs a frame transmission signal (a multiplex transmission signal). The frame transmission signal from the multiplexer 311 is converted into an optical frame transmission signal (referred to as a frame transmission signal) by the E/O converter 102. The frame transmission signal is supplied from the E/O converter 102 to the counterclockwise transmission line $L_L$ and transmitted therethrough. The frame transmission signal from the multiplexer 321 is converted into an optical frame transmission signal (referred to as a frame transmission signal) by the E/O converter 202. The frame transmission signal is supplied from the E/O converter 202 to the clockwise transmission line $L_R$ and transmitted therethrough.

The node is further provided with O/E converters 101 and 201, synchronous circuits 103 and 203, demultiplexers 104 and 204, a switching controller 500 and a switching circuit 600. Frame transmission signals (optical frame transmission signals) transmitted through the clockwise transmission line $L_R$ and the counterclockwise transmission line $L_L$ are respectively converted into electric signals (frame transmission signals) by the O/E converters 101 and 201. The frame transmission signals output by the O/E converters 101 and 201 are supplied to the synchronous circuits 103 and 203 and the demultiplexers 104 and 204. A set of the synchronous circuit 103 and the demultiplexer 104 has functions corresponding to the first transmission frame synchronous unit 10 and the first switched-signal unit synchronous unit 30. A set of the synchronous circuit 203 and the demultiplexer 204 has functions corresponding to the second transmission frame synchronous unit 20 and the second switched-signal unit synchronous unit 40. That is, each of the demultiplexers 104 and 204 demultiplexes the frame transmission signal into switched-signal units in synchronism with synchronous signals generated by a corresponding one of the synchronous circuits 103 and 203. Further, each of the demultiplexers 104 and 204 checks whether or not the switched-signal units are normal, and outputs the alarm signals (ALM1–ALMn) and (ALM1'–ALMn') indicating whether or not the switched-signal units are normal.

The switching controller 500 and the switching circuit 600 respectively correspond to the switching control unit 50 and the switching unit 60 shown in FIG. 2. That is, the switching controller 500 generates the selecting signals (CONT1–CONTn) based on the alarm signals (ALM1–ALMn) and (ALM1'–ALMn'). The switching circuit 600 performs the switching operation based on the selecting signals (CONT1–CONTn) so that switched-signal units are selected from the output of the demultiplexer 104 or from the output of the demultiplexer 204.

The frame transmission signal formed of the switched-signal units selected by the switching circuit 60 is supplied, as received data, through the terminal interface circuit 301 to a terminal at a receiving side.

Figure 4:
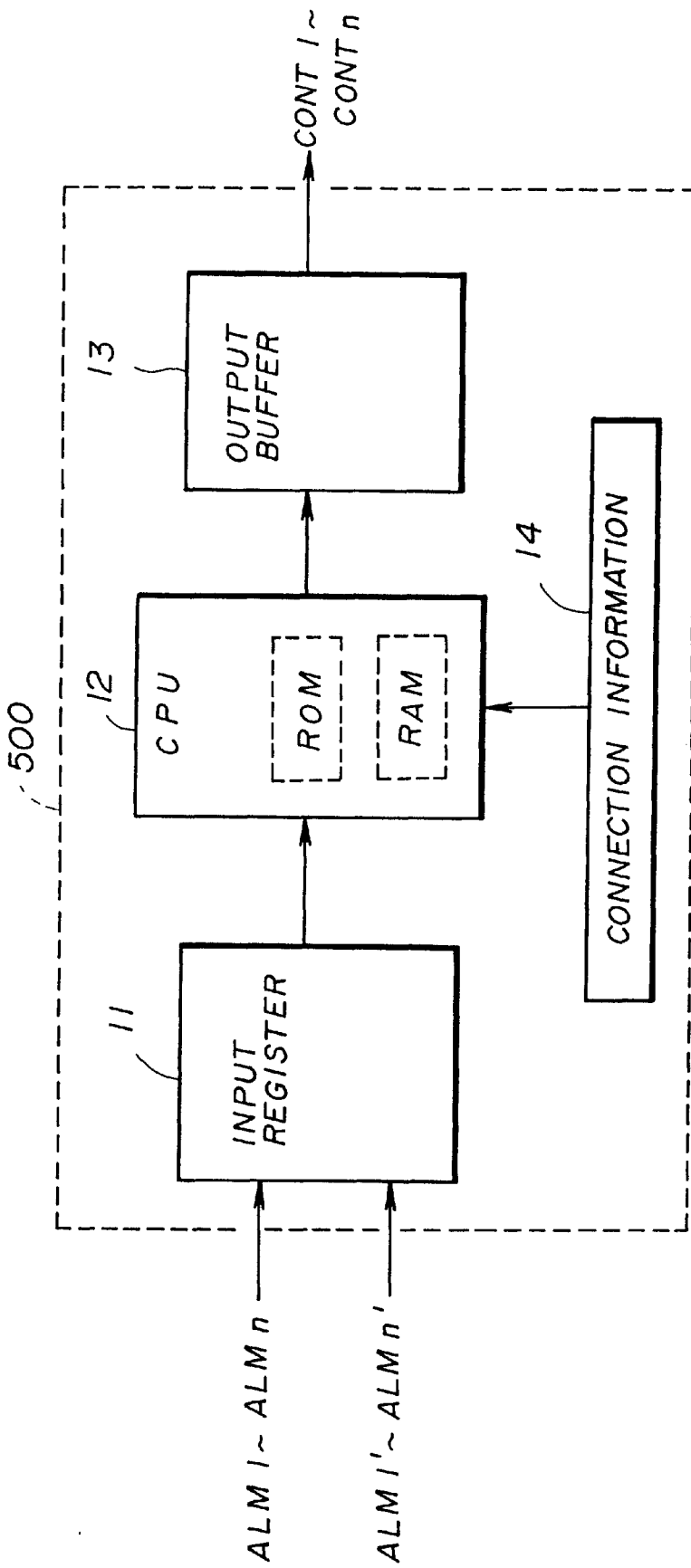
FIG. 4 is a block diagram illustrating a first example of a detailed structure of a switching control unit of the duplex communication path switching system shown in FIGS. 2 and 3.

The switching controller 500 is formed as shown in FIG. 4. Referring to FIG. 4, the switching controller 500 has an input register 11, a controller 12, an output buffer 13 and a memory 14. The controller 12 includes a CPU (Central Processing Unit), a ROM and a RAM. The alarm signals (ALM1–ALMn) and (ALM1'–ALMn') supplied from the demultiplexers 104 and 204 in the 0-system and the 1-system are set in the input register 11. The controller 12 reads the alarm signals (ALM1–ALMn) and (ALM1'–ALMn') set in the input register 11. When the frame transmission signal is received by the node, connecting data corresponding to the frame transmission signal is stored in the memory 14. The connecting data is supplied, for example, from the CPU. The connecting data indicates what switched-signal units in the frame transmission signal should be connected. The controller 12 generates a selecting signal (formed of parts CONT1–CONTn corresponding to switched-signal units) used to switch the communication path based on the alarm signals (ALM1–ALMn) and (ALM1'–ALMn'). The selecting signal is output from the switching controller 500 through the output buffer 13.

Figure 5:
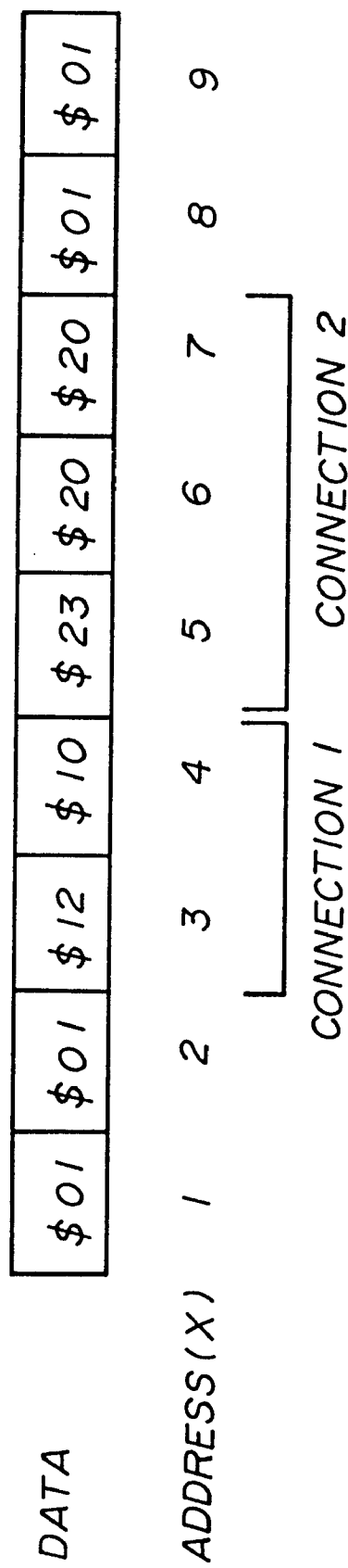
FIG. 5 is a diagram illustrating an example of a data structure including connection information.

The connecting data is formed as shown in FIG. 5. Referring to FIG. 5, the connecting data is formed of items ($01, $01, $12, $10, $23, $20, $20, $01, $01) corresponding to switched-data units of the frame transmission signal. The items of the connecting data are stored at addresses (X) in the memory 14, as shown in FIG. 5. Each of the items of the connecting data includes two numerals. A higher-place (Y) of the two numerals indicates whether or not a corresponding switched-signal unit should be connected to at least the next switched-signal unit. The higher-place (Y) of the two numerals is referred to as a connection sequence number. For example, when the connection sequence number is equal to "0", the corresponding switched-signal is not connected to the next switched-signal. When the connection sequence number is not equal to "0", the corresponding switched-signal is connected to at least the next switched-signal unit. When the connection sequence number is equal to "0", a lower-place (Z) of the two numerals is fixed at "1". When the connection sequence number is not equal to a "0", the lower-place (Z) thereof indicates the number of switched-signal units connected to each other. The lower place (Z) of the two numerals is referred to as a connected unit number.

Figure 6:
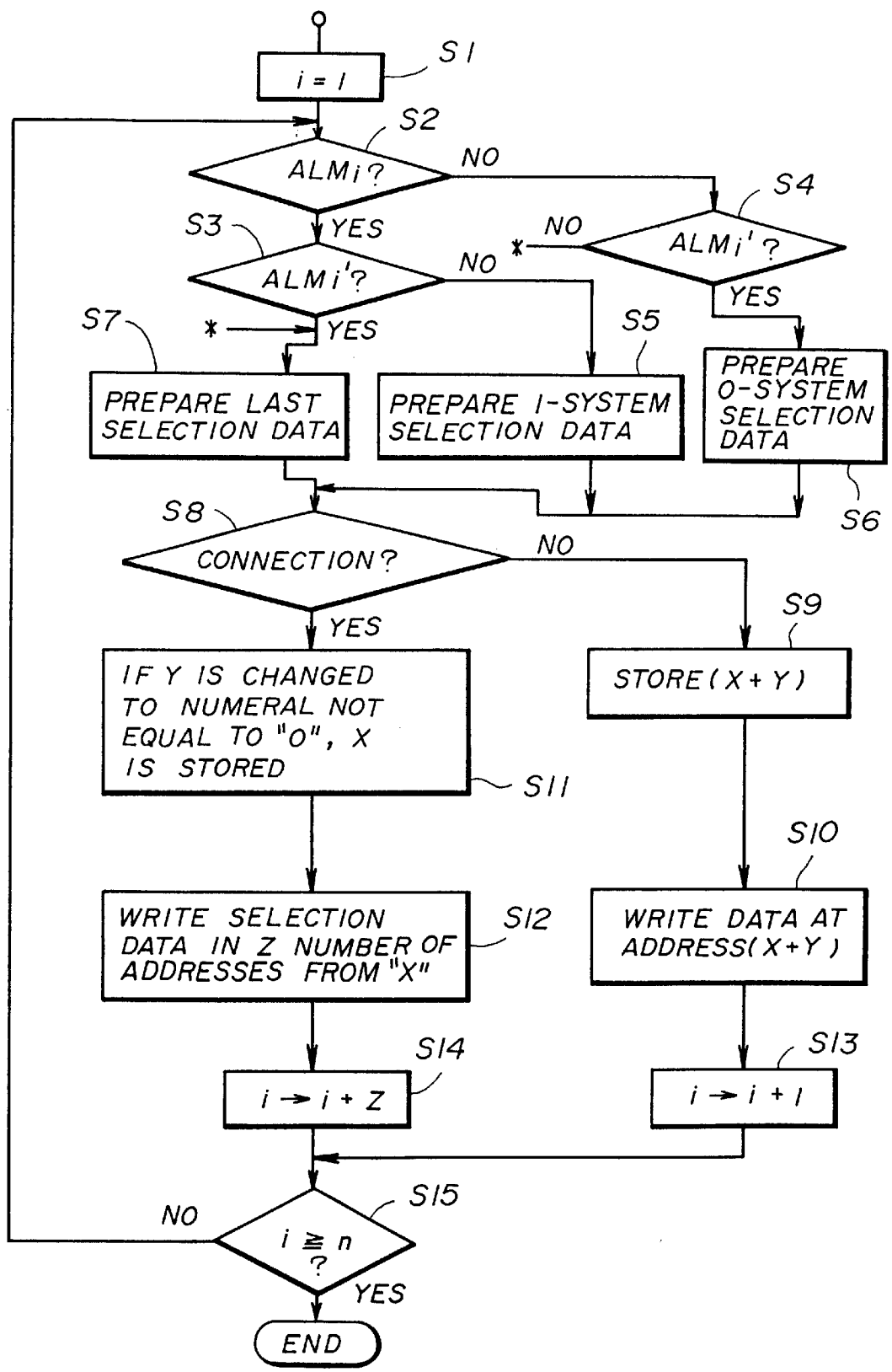
FIG. 6 is a flowchart illustrating a process of a switching operation.

The controller 12 generates the selecting signal in accordance with a procedure as shown in FIG. 6.

Referring to FIG. 6, a pointer i is initially set at "1" (step S1). It is then determined, based on the states of alarm signal ALM1 (i=1) and ALM1', whether or not switched-signal units (1) and (1') are normal (steps S2, S3 and S4). When the alarm signal ALM1 in the 0-system is in an on-state (abnormal) and the alarm signal ALM1' in the 1-system is in an off-state (normal), 1-system selection data (a) is prepared in the controller 12 (S5). When the alarm signal ALM1 in the 0-system is in the off-state (normal) and the alarm signal ALM1' in the 1-system is in the on-state (abnormal), 0-system selection data (a) is prepared in the controller 12 (S6). When the alarm signal ALM1 in the 0-system is in the off-state (normal) and the alarm signal ALM1' in the 1-system is in the off-state (normal), the selection data (the 0-system selection data or the 1-system selection data) which was prepared at the last time is maintained in the controller 12 (S7). Also when both the alarm signals ALM1 and ALM1' are in the on-state, the selection data which was prepared at the last time is maintained in the controller 12.

After the selection data (a) (the 0-system selection data or the 1-system selection data) is prepared in the controller 12 as described above, it is determined, based on the connecting data stored in the memory 14, whether the switched-signal unit (1) should be connected to the next switched-signal unit (S8). If it is determined, based on the higher place (Y) of the two numerals of the first items of the connecting data (see FIG. 5), that the switched-signal unit (1) should not be connected to the next switched-signal unit, a number of (X+Y) is stored in the RAM of the controller 12 (S9). In this case, X is equal to "1" and Y is equal to "0". That is, the number of "1" is stored in the RAM. The selection data (a) is thus stored at an address, identified by "1" (X+Y=1), in the output buffer 13 (S10). After this, the pointer i is incremented by one (S13), so that the pointer i is equal to "2" (i=2). Since the pointer i has not reached n, the process returns from step S15 to step S2.

In a case where the switched-signal unit has a fixed speed (e.g., 64 kbps) and the transmission speed of the communication path for the frame transmission signal is equal to or less than the speed of the switched-signal unit (there is no connection of the switched-signal units), steps S8, S9, S10, S13 and S15 are repeatedly performed until the pointer i reaches n. As a result, the selection data (a) (the 0-system selection data or the 1-system selection data) for each of the switched-signal units of the frame transmission signal is stored at an address which should be incremented by one in the output buffer 13. The controller 12 generates the selecting signal having the parts CONT1–CONTn corresponding to the selection data (a) stored at the addresses (X+Y; X=1, 2, . . . and Y=0) in the output buffer 13.

Figure 7:
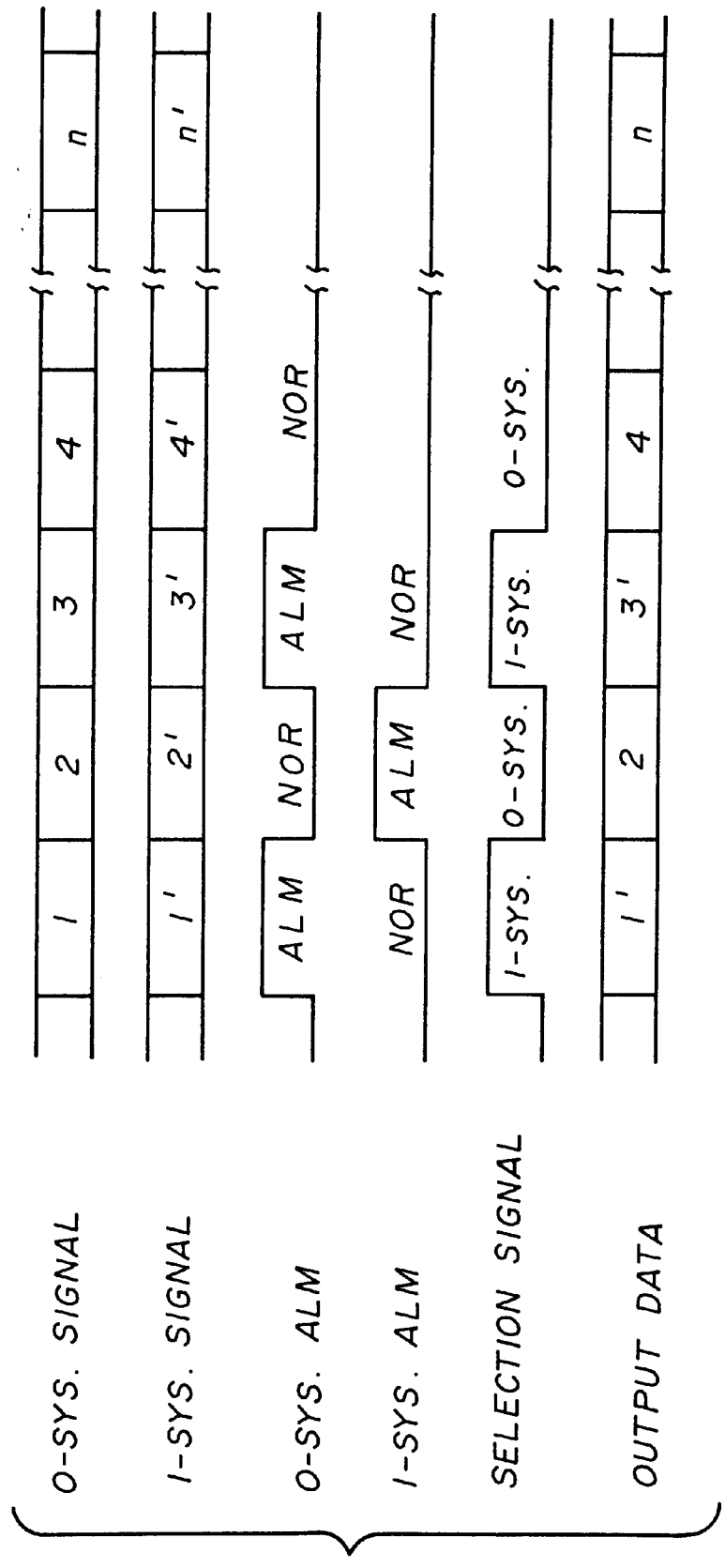
FIG. 7 is a timing chart illustrating a first example of the switching operation in the duplex communication path switching system shown in FIGS. 2 and 3.

In this case, for example, a switching operation is performed as shown in FIG. 7.

Referring to FIG. 7, the 0-system signal (the frame transmission signal) formed of switched-signal units (1, 2, . . . , n) and the 1-system signal (the frame transmission signal) formed of switched-signal units (1', 2', . . . , n') are respectively received from the clockwise transmission line (the 0-system) and the counterclockwise transmission line (the 1-system). The switched-signal units (1) and (3) of the 0-system signal are abnormal, so that the parts (ALM1 and ALM3) of the 0-system alarm signal are in the on-state (ALM). Other switched-signal units of the 0-system signal are normal, so that corresponding parts of the 0-system alarm signal are in the off-state (NOR). The switched-signal unit (2') of the 1-system signal is abnormal, so that the part (ALM2') of the 1-system alarm signal is in the on-state (ALM). Other switched-signal units of the 1-system signal are normal, so that corresponding parts of the 1-system alarm signal are in the off-state (NOR).

Thus, the parts CONT1 and CONT3 of the selecting signal are in a state where the switched-signal unit should be selected from the 1-system signal. Other parts of the selecting signal are in a state where the switched-signal unit should be selected from the 0-system signal. The selecting signal is supplied to the switching circuit 600. The switching circuit 600 switches the communication transmission path between the clockwise transmission line (the 0-system) and the counterclockwise transmission line (the 1-system) so that the output data formed of the switched-signal units (1' and 3') selected from the 1-system signal and other switched-signal units (2, 4, . . . , n) selected from the 0-system signal is output from the switching circuit 600. The data output from the switching circuit 600 is supplied, as the received data, to the terminal via the terminal interface circuit 301.

In a case where the transmission speed in the communication path exceeds the speed of the switched-signal unit (a signal formed of a plurality of switched-signal units connected to each other is included in the frame transmission signal), the controller 12 determines that the switched-signal unit is connected to the next switched-signal unit.

That is, returning to FIG. 6, in step S8, when the controller 12 determines that the connection sequence number (Y) of an item of the connecting data (see FIG. 5) is not "0", the process proceeds from step S8 to step S11. In step S11, if the connection sequence number (Y) is not equal to that of the previous item of the connecting data (the connection sequence number (Y) was changed), "X" is stored in the RAM of the controller 12. After this, the connected unit number (Z) included in the item of the connecting data is checked. The selection data (a) (the 0-system selection data or the 1-system selection data) prepared in step S5, S6 or S7 is stored, in parallel, at the connected unit number (Z) of addresses continuously arranged from the "X" in the output buffer 13 (S12).

The pointer i is then incremented by the connected unit number (Z) (S14). If the pointer i does not reach n (S15), the process returns from step S15 to step S2. After this, the process described above is repeatedly performed until the pointer i reaches n.

When the controller 12 detects an item of the connection data having the connection sequence number (Y) equal to zero, the switching operation is performed in the same manner as in the case shown in FIG. 7. On the other hand, as has described above, when the controller 12 detects an item of the connection data having a connection sequence number (Y) not equal to zero and a connected unit number (Z), the controller 12 recognizes that the connected unit number (Z) of switched-signal units including a switched-signal unit corresponding to the item of the connection data should be connected. If the alarm signal corresponding to one of the switched-signal units which should be connected to each other is in the on-state (abnormal), the controller 12 recognizes that the alarm signals corresponding to all the switched-signal units connected to each other should be in the on-state (abnormal).

Figure 8:
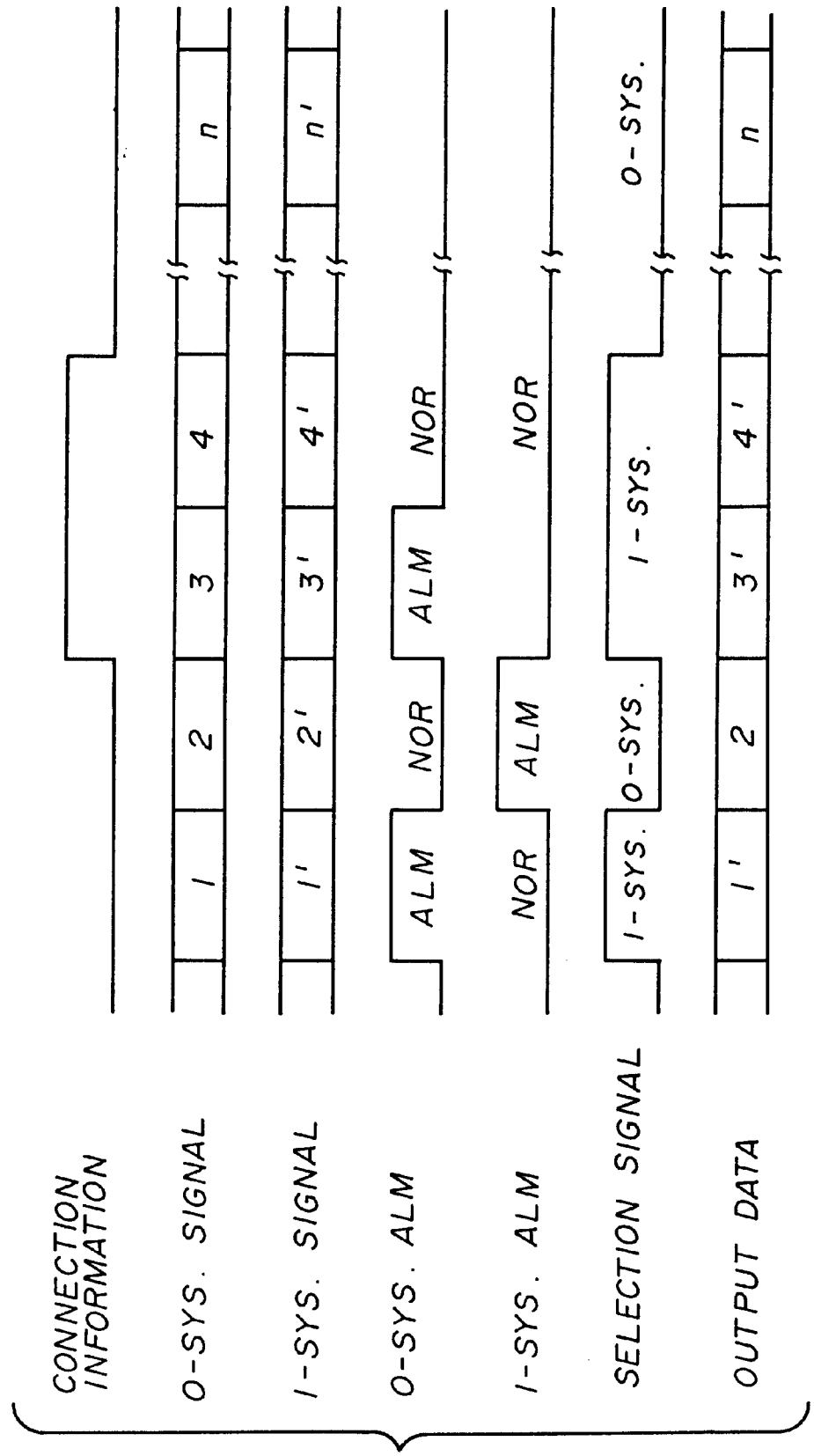
FIG. 8 is a timing chart illustrating a second example of the switching operation in the duplex communication path switching system shown in FIGS. 2 and 3.

In this case, for example, a switching operation is performed as shown in FIG. 8.

Referring to FIG. 8, the 0-system signal (the transmission frame signal) includes switched-signal units (3) and (4) connected to each other, and the 1-system signal (the transmission frame signal) includes switched-signal units (3') and (4') connected to each other. Thus, items of the connecting data corresponding to the switched-signal units (3) and (4)(and the switched-signal units (3') and (4')) have the connection sequence number (Y) not equal to "0" (see FIG. 5). Further, the item of the connecting data corresponding to the switched-signal unit (3) (and the switched-signal unit (3')) has the connected unit number (Z) equal to "2" (see FIG. 5).

When the controller 12 detects that the alarm signal corresponding to the switched-signal unit (3) of the 0-system signal is in the on-state (abnormal), the controller 12 recognizes that the two (the connected unit number (Z)) switched-signal units (3') and (4') of the 1-system should be selected. Thus, the parts CONT3 and CONT4 of the selecting signal are in a state where the switched-signal units should be selected from the 1-system signal. The selecting signal is supplied to the switching circuit 600. The switching circuit 600 switches the communication transmission path between the clockwise transmission line (the 0-system) and the counterclockwise transmission line (the 1-system) so that the output data including the switched-signal units (3' and 4') selected from the 1-system signal and other switched-signal units (2, ... , n) selected from the 0-system signal is output from the switching circuit 600.

According to the above embodiment, when the transmission speed of data in the communication path is equal to less than the speed of each of the switched-signal units, the communication path is always switched, for the switched-signal unit, between the 0-system (e.g., the clockwise transmission line) and the 1-system (e.g., the counterclockwise transmission line). When the transmission speed of data in the communication path is greater than the speed of each of the switched signal units, the communication path is switched, for a plurality of switched-signal units to be connected to each other, between the 0-system and the 1-system.

Figure 9:
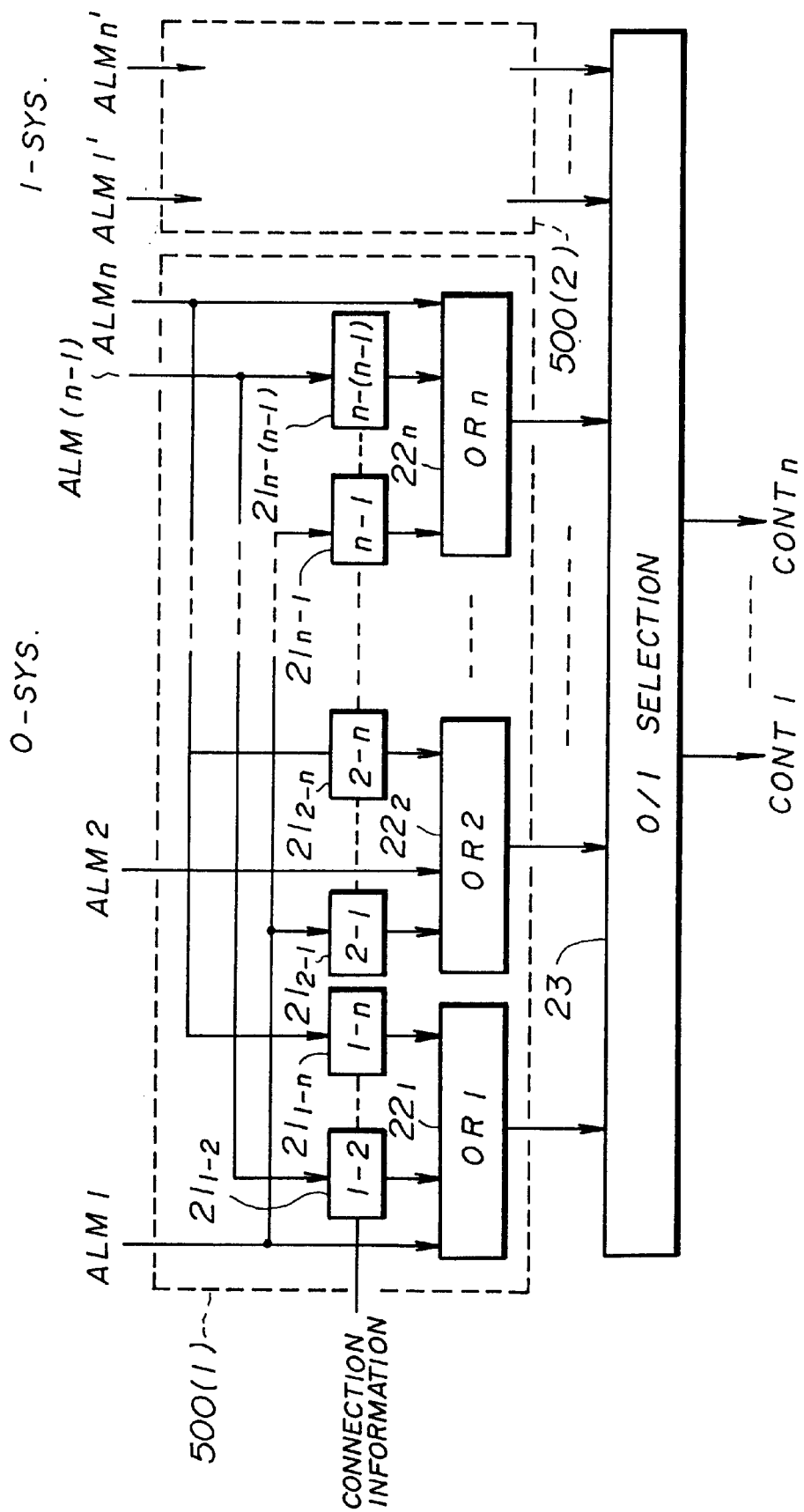
FIG. 9 is a block diagram illustrating a second example of the detailed structure of the switching control unit of the duplex communication switching system shown in FIGS. 2 and 3.

The switching controller 500 may be formed as shown in FIG. 9. Referring to FIG. 9, the switching controller 500 has a 0-system logic circuit 500(1), a 1-system logic circuit 500(2) and a 0/1 selection circuit 23. Each of the 0-system logic circuit 500(1) and the 1-system logic circuit 500(2) has inhibit-gates $21_{1-2}, \ldots, 21_{1-n}, 21_{2-1}, 21_{2-3}, \ldots 21_{2-n}, \ldots,$ and $21_{n-1}, \ldots 21_{n-(n-1)}$ and OR gates OR1, ... ,ORn. The inhibit-gates $21_{1-2}, \ldots, 21_{1-n}$ are respectively provided with the alarm signals ALM2, ... , ALMn. The inhibit-gates $21_{2-1}, 21_{2-3}, \ldots, 21_{2-n}$ are provided with the alarm signals ALM1, ALM3, ... , ALMn. The inhibit-gates $21_{n-1}, \ldots 21_{n-(n-1)}$ are provided with the alarm signals ALM1, ... , ALM(n−1). Each of the inhibit-gates is in an on-state or in an off-state in accordance with the connection data (see FIG. 5). The alarm signal passes through each of the inhibit-gates which are in the on-state. The OR gate OR1 is provided with the alarm signal ALM1 and is coupled with the inhibit-gates $21_{1-2}, \ldots, 21_{1-n}$. The OR gate OR2 is provided with the alarm signal ALM2 and is coupled with the inhibit-gates $21_{2-1}, 21_{2-3}, \ldots 21_{2-n}$. The OR gate ORn is provided with the alarm signal ALMn and is coupled with the inhibit-gates $21_{n-1}, \ldots 21_{n-(n-1)}$.

When the connecting data indicates that a switched-signal unit (i) should be connected to other switched-signal units, inhibit-gates provided with alarm signals corresponding to the other switched-signal units are in the on-state. Thus, the OR gate ORi is provided with the alarm signals corresponding to the other switched-signal units along with the alarm signal ALMi corresponding to the switched-signal unit (i). As a result, the OR gate ORi outputs a integrated-alarm signal into which the alarm signal ALMi and the alarm signals corresponding to the other switched-signal units connected to the switched-signal unit (i) are integrated.

On the other hand, when the connecting data indicates that a switched-signal unit (i) is not connected to other switched-signal units, inhibit-gates are provided with alarm signals corresponding to other switched-signal units are in the off-state. Thus, the OR gate OR1 is provided with only the alarm signal ALMi. As a result, the OR gate ORi outputs only the alarm signal ALMi corresponding to the switched-signal unit (i).

The 0/1 selection circuit 23 generates a selection signal having the parts CONT1–CONTn based on the alarm signals and/or the integrated-alarm signals supplied from the 0-system logic circuit 500(1) and the 1-system logic circuit 500(2). As has been described above, each of the parts CONT1–CONTn of the selection signal indicates whether the switched-signal unit should be selected from the 0-system signal or the 1-system signal.

For example, in a case where switched-signal units (3) and (4) of five switched-signal units (1), (2), (3), (4) and (5) forming the 0-system signal are connected (the switched-signal units (3') and (4') of the 1-system signal are connected), the inhibit-gates $21_{3-4}$ and $21_{4-3}$ are in the on-state based on the connecting data as shown in FIG. 10. As a result, the integrated-alarm signal into which the alarm signal ALM3 supplied to the OR gate OR3 and the alarm signal ALM4 passing through the inhibit-gate $21_{3-4}$ and supplied to the OR gate OR3 are integrated is supplied to the 1/0 selection circuit 23. Further, the integrated-alarm signal into which the alarm signal ALM4 supplied to the OR gate OR4 and the alarm signal ALM3 passing through the inhibit-gate $21_{4-3}$ and supplied to the OR gate OR4 are integrated is supplied to the 1/0 selection circuit 23. The 1/0 selection circuit 23 outputs the selection signal including the parts CONT3 and CONT4 both of which indicate that the switched-signal unit should be selected from the same system signal, the 0-system signal or the 1-system signal, so that the switched-signal units (3) and (4) or (31) and (4') are connected to each other.

A description will now be given, with reference to FIG. 11, of a second embodiment of the duplex communication path switching system. In the second embodiment, although there is no frame information defined for every signal unit of a signal transmitted through the duplex communication path of the ring network, there is frame information specific to various types of signal units of a signal transmitted through the duplex communication path. The frame information specific to a type of signal unit is added to the type of signal unit.

Figure 11:
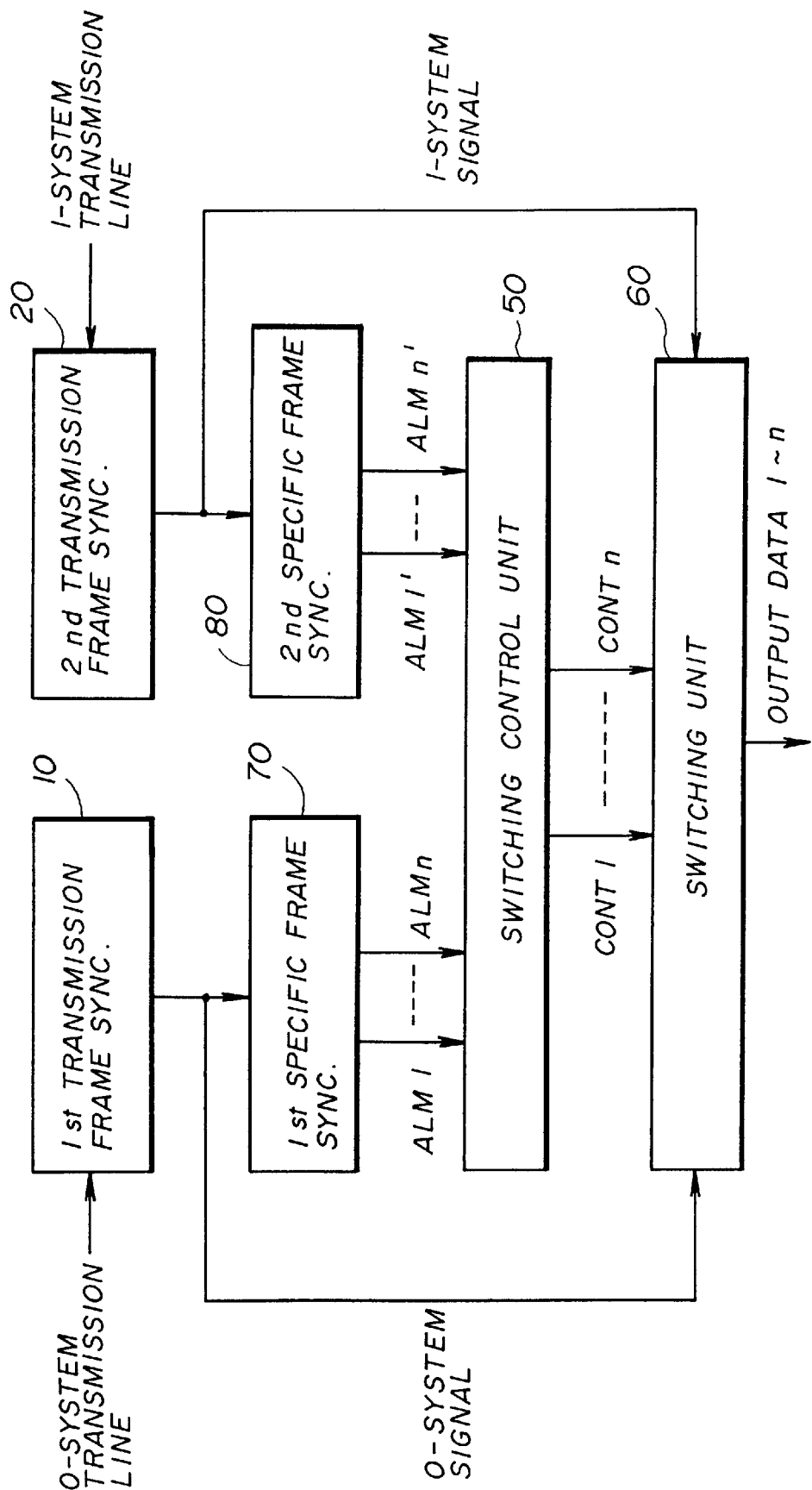
FIG. 11 is a block diagram illustrating a second embodiment of the duplex communication path switching system applicable to a node in the ring network.

Referring to FIG. 11, the duplex communication path switching system has the first transmission frame synchronous unit 10, the second transmission frame synchronous unit 20, the switching control unit 50 and the switching unit 60, in the same manner as that shown in FIG. 2. The duplex communication switching system further has a first specific frame synchronous unit 70 and a second specific frame synchronous unit 80. The first specific frame synchronous unit 70 synchronizes specific frames of each of the 0-system signals synchronized by the first transmission frame synchronous unit 10. The first specific frame synchronous unit 70 further checks whether or not each of signal units (1–n) synchronized by the specific frames is normal, and outputs alarm signals (ALM1–ALMn). Each of the alarm signals (ALM1–ALMn) indicates whether a corresponding one of the signal units (1–n) is normal or abnormal. The second specific frame synchronous unit 80 synchronizes specific frames of each of the 1-system signals synchronized by the second transmission frame synchronous unit 20. The second specific frame synchronous unit 80 further checks whether or not each of signal units (1'–n') synchronized by the specific frames is normal, and outputs alarm signals (ALM1'–ALMn'). Each of the alarm signals (ALM1'–ALMn') indicates whether a corresponding one of the signal units (1'–n') is normal or abnormal.

The switching control unit 50 outputs selecting signals (CONT1–CONTn) depending on the states of the alarm signals (ALM1–ALMn) in the 0-system and the alarm signals (ALM1'–ALMn') in the 1-system, in the same manner as that in the first embodiment described above. Each of the selecting signals (CONT1–CONTn) indicates the 0-system signal or the 1-system signal from which the signal unit should be selected. The switching unit 60 performs a switching operation based on the selecting signals (CONT1–CONTn) so that the signal unit is selected from the 0-system signal or the 1-system signal, in the same manner as that shown in FIG. 2. Output data formed of the signal units (1–n) selected by the switching unit 60 is supplied from the switching unit 60 to a terminal at the receiving side.

Figure 12A:
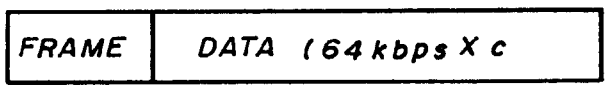
FIGS. 12A and 12B are diagrams illustrating a general structure in which specific frame information is added to signal units.
Figure 12B:
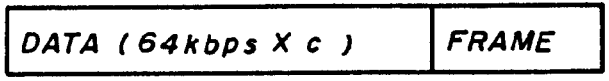
Figure 13:
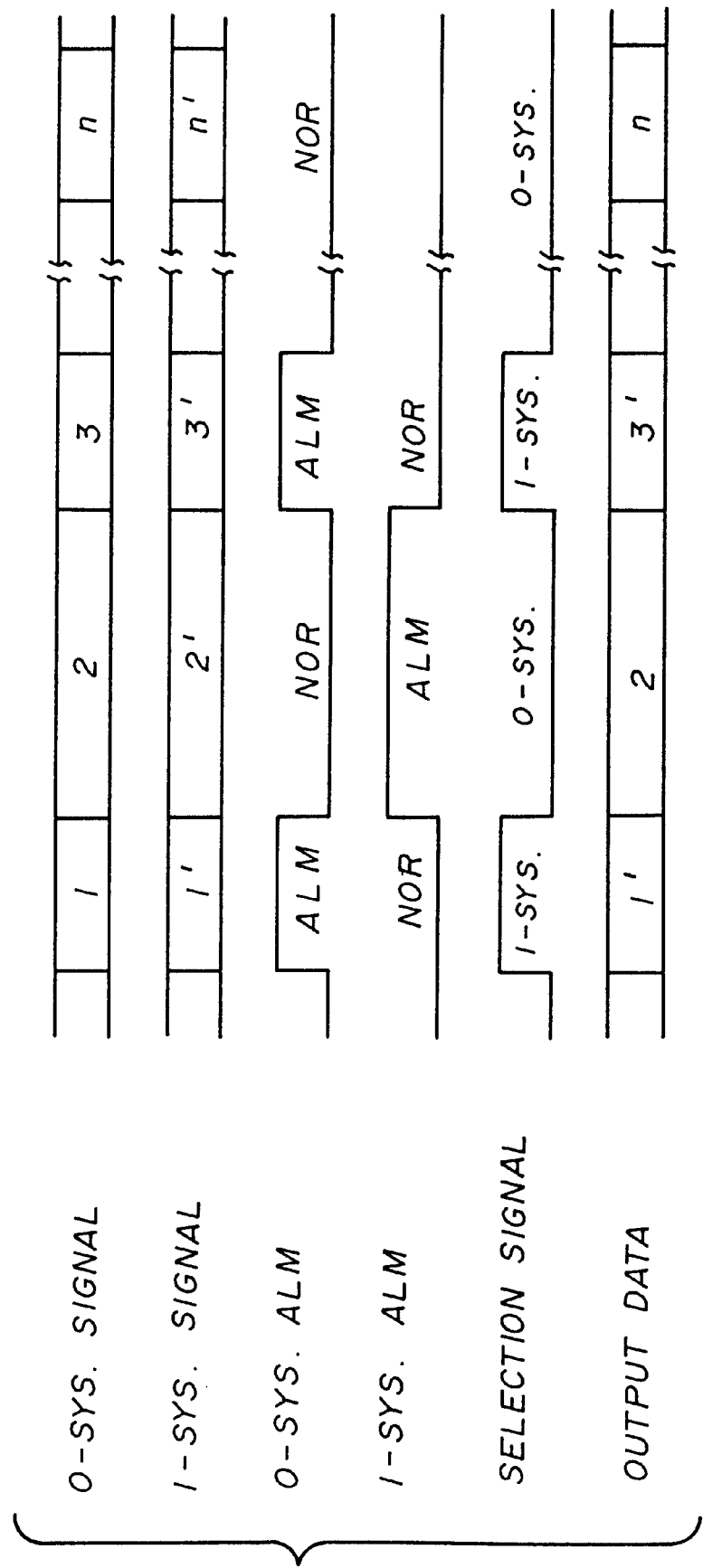
FIG. 13 is a timing chart illustrating an example of the switching operation in the duplex communication path switching system shown in FIG. 11.

The specific frame information is included in the 0-system signal (1–n) and in the 1-system signal (1'–n') shown in FIG. 13. The specific frame information may be added, as shown in FIG. 12A, to the head of each signal unit (64 kbps×c). The specific frame information may also be added, as shown in FIG. 12B, to the end of each signal unit (64 kbps×c).

Figure 12C:
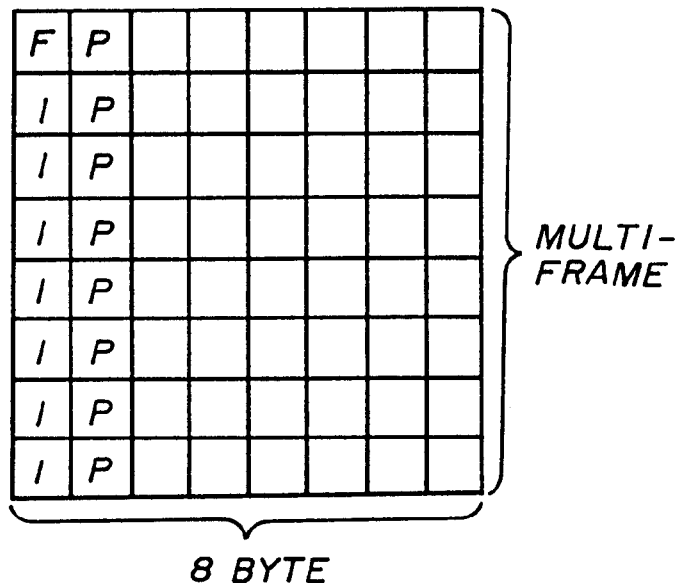
FIGS. 12C and 12D are diagrams illustrating structures of the specific frame.

FIG. 12C shows a case where a single multi-frame (the signal unit) is formed of eight frames and one byte (eight bits) is used for the specific frame information. Referring to FIG. 12C, frame bits F are located at the head of the first frame in the multi-frame. The frame bits F form a pattern in which bits of "0" and "1" are alternately arranged or a pattern in which all bits "0" are arranged. A pattern in which all bits "1" are arranged is located at the head of each of frames other than the first frame including the frame bits F. Each of the frames of the multi-frame includes parity bits P. The parity bits P are used to check whether or not a corresponding frame is normal. Based on the checking result, the state of the alarm signal (ALM) is controlled.

Figure 12D:
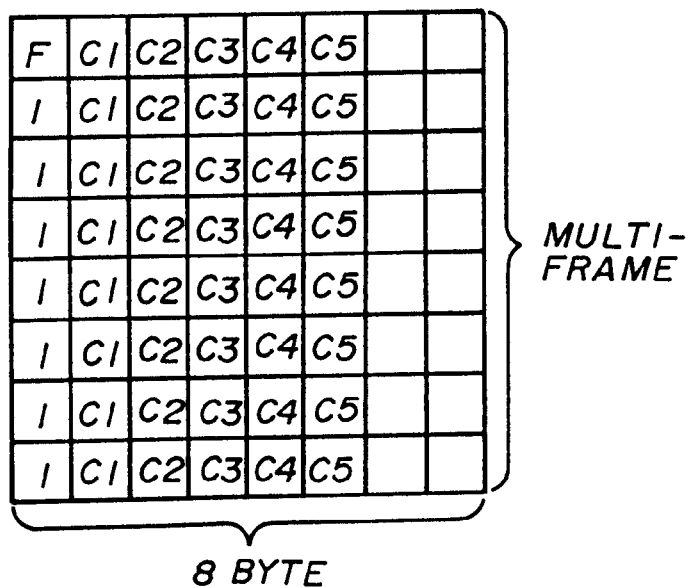

FIG. 12D shows a multi-frame which is formed of eight frames, and in which the frame bits F are located at the head of the first frame, in the same manner as that shown in FIG. 12C. Each of the frames is provide with CRC bits C1, C2, C3, C4 and C5. The CRC bits are used to check whether or not a corresponding frame is normal. Based on the checking result, the state of the alarm signal ALM is controlled.

In this case, the switching operation of the duplex communication path is performed as shown in FIG. 13. Referring to FIG. 13, the specific frame synchronous unit 70 checks whether or not each of signal units divided by the specific frame information in the 0-system signal is normal. The 0-system alarm signal having states (ALM and NOR) depending on the checking results (normal and abnormal) to the signal units is output from the first specific frame. The second specific frame synchronous unit 80 outputs, in the same manner as the first specific frame synchronous unit 70, the 1-system alarm signal having states (ALM and NOR) depending on the checking results (normal and abnormal) to the signal units.

The switching control unit 50 outputs the selection signal having the states (the 0-system and the 1-system) based on the 0-system alarm signal and the 1-system alarm signal. The switching unit 60 switches the communication path between the clockwise transmission line (the 0-system) and the counterclockwise transmission line (the 1-system) based on the selecting signal.

Thus, even if a signal unit (2 and 2') having a speed greater than those of other signals is transmitted through the communication path, the switching operation of the communication path is performed so that the signal unit (2) is accurately selected from the 0-system signal in the same manner as other signal units.

In the respective embodiments, the communication path is switched in accordance with the 0/1-system switching logic. However, the switching logic applied to the present invention is not limited to only the 0/1-system switching logic. The N/E-system switching logic may be applied to the present invention. In this case, the switching control unit 50 generates the selecting signal based on the alarm signals in accordance with the N/E-system switching logic.

The present invention is not limited to the aforementioned embodiments, and other variations and modifications may be made without departing from the scope of the claimed invention.

What is claimed is:

1. A duplex communication path switching system provided at each of nodes connected by a communication path in a ring network, the communication path having a first transmission line through which a first signal is transmitted in a first direction and a second transmission line through which a second signal is transmitted in a second direction opposite to the first direction, the first signal and the second signal being formed of a plurality of units and respectively supplied to said first transmission line and said second transmission line in parallel to transmit each signal from one node to another through the communication path, said duplex communication path switching system comprising:

checking means provided at each of the nodes for checking whether or not each of the plurality of units of the first and second signals received from said first and second transmission lines is error-free; and switching means provided at each of the nodes for switching the communication path between said first transmission line and said second transmission line based on checking results obtained by said checking means, so that the switching means outputs data that are formed of error-free units selected from either the plurality of units of the first signal or the plurality of units of the second signal, wherein each of the plurality of units of the first and second signals is provided with specific frame information which is specific to said each of the plurality of units, the checking means using the specific frame information to divide each signal into the plurality of units, wherein said switching means comprises:

first means for generating a selection signal based on the checking results obtained by said checking means, the selection signal indication which of the first signal units received from the first transmission line and the second signal units received from the second transmission line should be selected; and second means for switching the communication path between the first transmission line and the second transmission line based on the selection signal generated by said first means.

2. The duplex communication path switching system as claimed in claim 1, wherein said switching means performs a switching operation in accordance with a 0\1-system switching logic, said communication path being switched form an 0 system including said first transmission line to a 1 system including said second transmission line when said 0 system malfunctions.

3. A duplex communication path switching system provided at each of nodes connected by a communication path in a ring network, the communication path having a first line transmission through which a first signal is transmitted in a first direction and a second transmission line through which a second signal is transmitted in a second direction opposite to the first direction, the first signal and the second signal being formed of a plurality of units and respectively supplied to said first transmission line and said second transmission line in parallel to transmit each signal from one node to another through the communication path, said duplex communication path switching system comprising:

checking means provided at each of the nodes for checking whether or not each of the plurality of units of the first and second signals received from said first and second transmission lines is error-free; and switching means provided at each of the nodes for switching the communication path between said first transmission line and said second transmission line based on checking results obtained by said checking means so that the switching means outputs data that are formed of error-free units selected from either the plurality of units of the first signal or the plurality of units of the second signal, wherein each of the plurality of units of the first and second signals has a constant speed and is provided with frame information defined for the first and second signals transmitted through the communication path, the checking means using the frame information to divide each signal into the plurality of units, wherein said switching means comprises:

first means for generating a selection signal based on the checking results obtained by said checking means, the selection signal indicating which of the first signal units received from the first transmission line and the second signal received from the second transmission line should be selected; and second means for switching the communication path between the first transmission line and the second transmission line based on the selection signal generated by said first means.

4. The duplex communication path switching system as claimed in claim 3, further comprising:

setting means for setting connection information in said duplex communication path switching system, the connection information indicating that units of the signal should be connected; and means for controlling said switching means so that units which are indicated as the units to be connected by the connection information are selected from the signal received from the same transmission line.

5. The duplex communication path switching system as claimed in claim 3, wherein the frame information is defined by a predetermined standard.

6. The duplex communication path switching system as claimed in claim 3, wherein said switching means performs a switching operation in accordance with a 0\1-system switching logic, said communication path being switched form an 0 system including said first transmission line to a 1 system including said second transmission line when said 0 system malfunctions.

* * * * *